United States Patent [19]
Filkins

[11] Patent Number: 5,348,119
[45] Date of Patent: Sep. 20, 1994

[54] TREE STAND AND ADAPTOR COMPRISING THE SAME

[76] Inventor: James S. Filkins, P.O. Box 122, North Egremont, Mass. 01252

[21] Appl. No.: 64,379

[22] Filed: May 21, 1993

[51] Int. Cl.⁵ .............................................. A01M 31/02
[52] U.S. Cl. ....................................... 182/187; 182/38
[58] Field of Search ................... 182/187, 188, 38, 36, 182/37

[56] References Cited
U.S. PATENT DOCUMENTS
2,405,259  8/1946  Lamb ................................. 182/187

Primary Examiner—Alvin C. Chin-Shue
Attorney, Agent, or Firm—Ira S. Dorman

[57] ABSTRACT

A tree stand consists of mounting structure and a platform member, the platform member being rotatable about the mounting structure to permit facile reorientation without need for dismounting by the occupant. The platform member may itself provide the necessary seating and standing areas, or those parts may be provided as a separate assembly.

10 Claims, 3 Drawing Sheets

5,348,119

TREE STAND AND ADAPTOR COMPRISING THE SAME

BACKGROUND OF THE INVENTION

So-called "tree stands" or "deer stands" are widely used by hunters to provide an elevated perch and a good vantage point. Typically, such stands consist of two platforms, disposed at different levels to provide areas for sitting and standing, together with means for mounting the platform assembly on the supporting tree trunk. Although the mounting means will often be so designed as to permit positioning of the platforms at a selected height on, and angular orientation about, the tree, as far as is known no stand heretofore available enables facile reorientation of the platform assembly, and certainly not without requiring the occupant to dismount.

SUMMARY OF THE INVENTION

Accordingly, it is the broad object of the present invention to provide a tree stand that is readily secured in position on the trunk of the supporting tree, and that permits facile reorientation of the platform member to positions displaced angularly thereabout.

More specific objects of the invention are to provide such a stand in which the platform member may itself provide the required platform or platforms, or may instead function as an adaptor, providing means by which a separate platform assembly can be attached thereto for support by a tree.

It has now been found that the foregoing and related objects of the invention are attained by the provision of a tree stand that includes mounting structure and a platform member rotatably mounted thereon. The mounting structure includes first and second coaxially disposed circular track members, spaced from one another on their common axis for circumscribing a supporting tree trunk at different levels, and means for fastening the mounting structure to a tree trunk with the track members extending thereabout, the first track member being disposed upwardly of the second track member in the position or normal use of the stand. The platform member includes first and second engagement components, operatively joined to one another and slidably engaging the first and second track members, respectively, thus permitting rotation of the platform member to positions angularly displaced about the mounting structure.

Normally, the track members will be connected rigidly to one another, and preferably at least one of: (a) the engagement components, and (b) the track members, will comprise low-friction elements, most desirably taking the form of rollers. The platform member may include at least one platform that is substantially horizontally disposed in the position of normal use and that has one of the engagement components thereon. Alternatively, the platform member may comprise a bracket having means for attaching a separate platform assembly (including at least one platform) to the stand, which attachment means may comprise the second engagement component.

In certain embodiments of the stand, both of the engagement components will be disposed on one side of the mounting structure and will comprise a lip member and an abutment member, respectively. The track members of such a stand may comprise coaxially disposed cylindrical wall elements, with the lip member of the first engagement component operatively engaging an inside surface of the wall element of the first track member, and with the abutment member of the second component operatively engaging an outside surface of the wall element of the second track member.

In other embodiments, the track members will have outside surfaces on which the first and second engagement components bear, being disposed on opposite sides of the mounting structure and being joined to one another by a brace that includes diagonally extending elements. The brace may have means thereon for engaging elements of a separate platform assembly for the cooperative support thereof.

DETAILED DESCRIPTION OF THE ILLUSTRATED EMBODIMENTS

Figure 1:
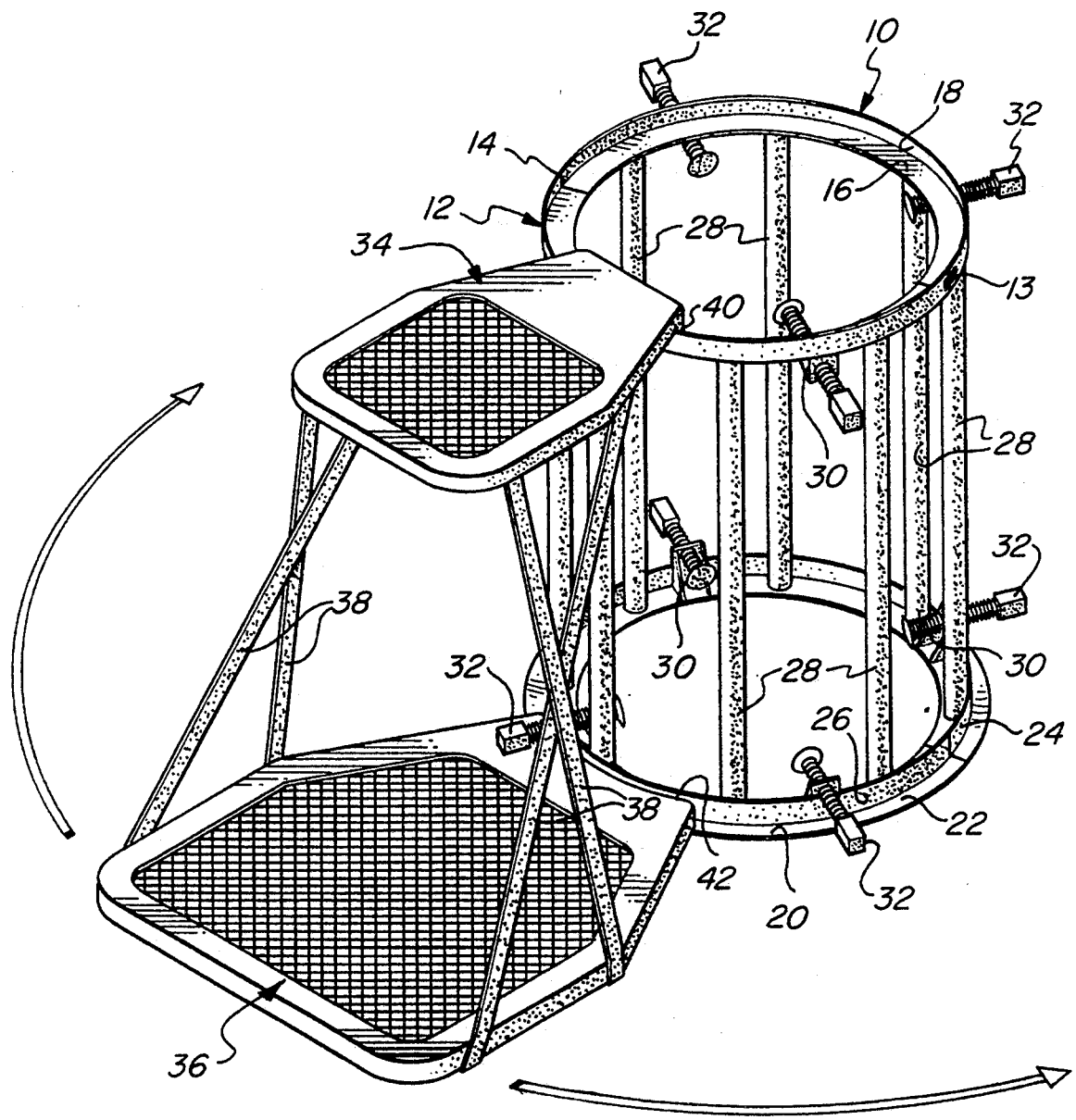
FIG. 1 is a perspective view showing a tree stand embodying the present invention.

Turning initially to FIG. 1 of the drawings, therein illustrated is a tree stand embodying the present invention and including mounting structure fabricated in two sections, generally designated by the numerals 10 and 12. The sections 10, 12 are of semi-cylindrical form, and they are joined to one another in confronting relationship (about a supporting tree, not illustrated), such as by fasteners 13, so as to cooperatively provide a cylindrical, cage-like mounting structure.

A low, axially extending cylindrical wall 14, and an annular base flange 16, circumscribe the top of the mounting structure and provide an internal bearing surface 18. An annular element 20 circumscribes the bottom of the structure and supports on its upper surface 22 a coaxial, low cylindrical wall 24, which provides an external bearing surface 26. The resulting ring-like components provide track members, which are affixed to one another in a mutually spaced, coaxial relationship by a set of tubular bars 28 arranged at equiangularly spaced locations about the mounting structure. Four mounting brackets 30 are fastened at 90° intervals about each of the track members for the receipt of clamping screws 32, the latter being threadably engaged in the brackets 30 and having a square head at one end and a rotatably mounted contact disk at the other, the functions of which are conventional and self-evident. As will be appreciated, the mounting structure is secured upon the supporting tree by first assembling the separate halves 10 and 12 thereabout, and thereafter clamping the structure upon the tree trunk merely by tightening the screws 32.

The platform member consists of an upper platform and a lower platform, generally designated by the numerals 34 and 36, respectively, rigidly fixed to one another by the cross braces 38. The upper platform 34 has an arcuate lip member 40 along its forward margin, which depends therefrom into engagement behind the upper wall element 14, riding upon the internal bearing surface 18 thereof. The lower platform 36 has an arcuate forward edge element 42 thereon, which abuts against the wall element 24 of the lower track member, and slidably rides upon its exterior bearing surface 26.

As indicated by the oppositely directed curved arrows, the platform member is rotatable on the mounting structure, and hence can readily be reoriented to any selected position about the supporting tree. Such reorientation can be effected by the occupant without dismounting the platform member, such as by clasping a stationary structure (e.g., the tree trunk) and shifting his lower body to move the platform member to the desired position. As will also be appreciated, movement is facilitated by the provision of low-friction surfaces 18, 26 on the wall elements 14, 24, on the lip member and abutment member 40, 42, or on all such bearing surfaces.

Figure 2:
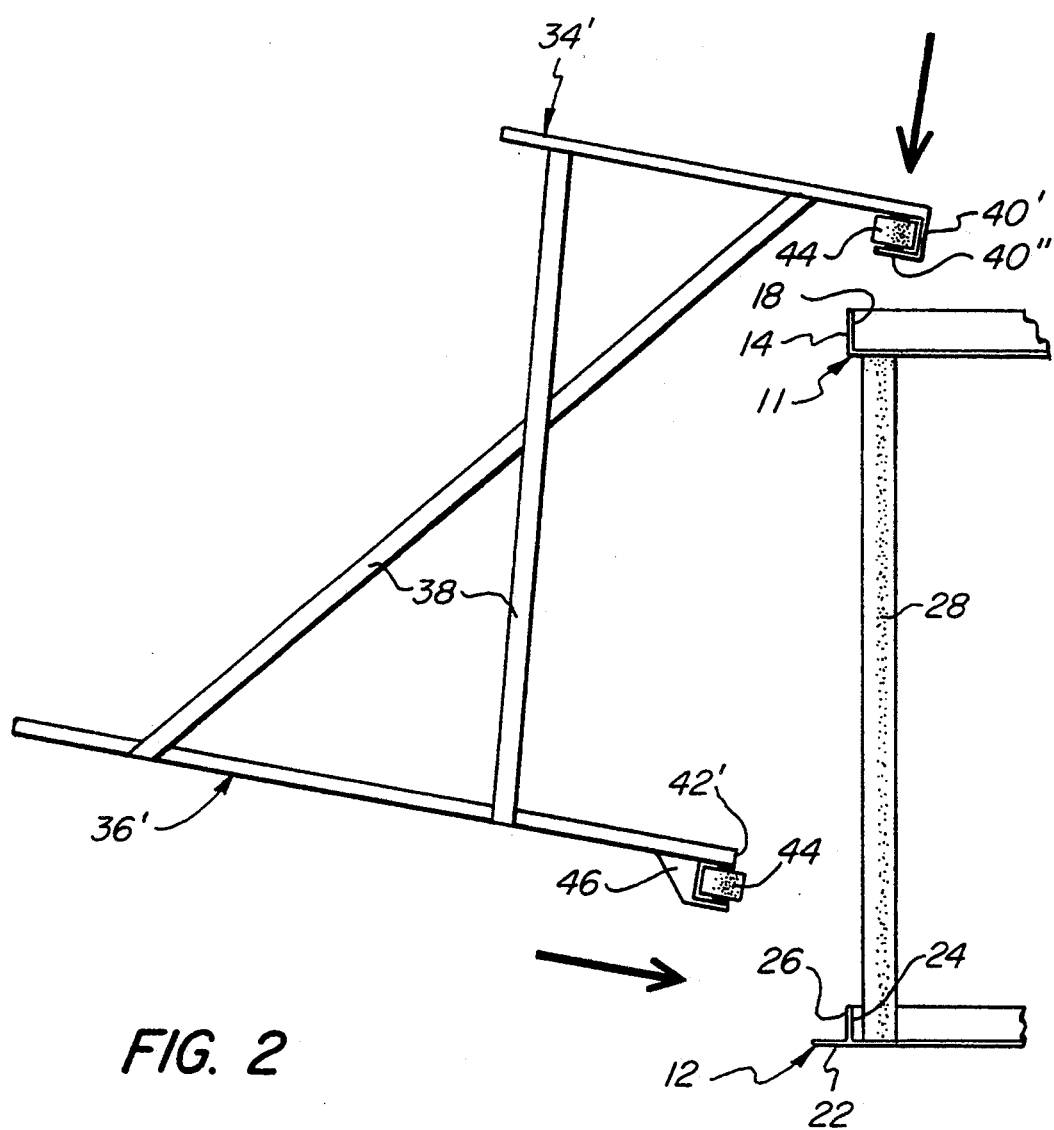
FIG. 2 is an elevational view of the stand slightly modified from that of FIG. 1, showing the platform member positioned just prior to engagement with the mounting structure, the latter being fragmentarily illustrated.

FIG. 2 shows a modification of the stand of FIG. 1, by which greater facility of the platform member reorientation is afforded. Thus, the low-friction elements employed take the form of wheels or rollers 44. More particularly, the lip member on the upper platform 34' includes a depending element 40' and a bottom flange 40", forming a channel in which the roller 44 is mounted. Similarly, a mounting bracket 46 is affixed beneath the platform 36' under the inner marginal portion 42' thereof, again to hold a roller 44. As will be appreciated, at least two rollers 44 will normally be provided at spaced locations along the front of both the upper platform 34' and also the lower platform 36', to provide at least two points of contact upon the corresponding wall elements 14 and 24.

Figure 3:
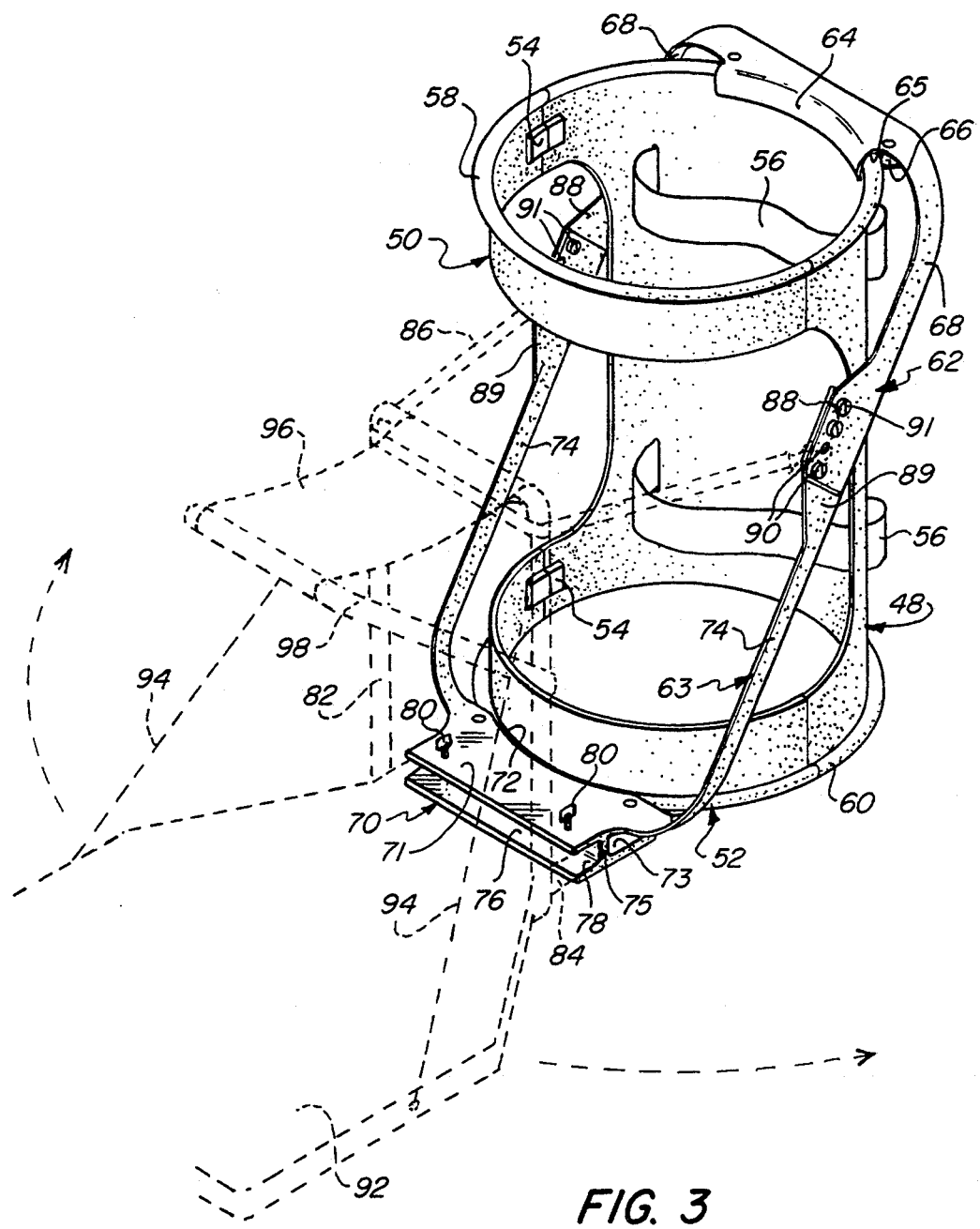
FIG. 3 is a perspective view of a second form of tree stands embodying the present invention, designed for use with a separate platform assembly, the latter being shown in phantom line representation.

Turning now to FIG. 3 of the drawings, the tree stand illustrated therein takes the form of an adaptor, and is constructed to permit use with a separate platform assembly that is itself devoid of means for slidable engagement. The mounting structure is formed in three sections; i.e., a semicylindrical back section, generally designated by the numeral 48, and two semicircular front sections generally designated by the numerals 50 and 52. Each of the sections 50, 52 is fastened in confronting relationship to the back section 48 by a pair of fasteners 54 (only one fastener of each pair being visible) and the back section 48 is provided with a pair of straps 56 for securing it to the supporting tree. The sections 48, 50, 52 cooperatively provide upper and lower circular track members 58 and 60, respectively, circumscribing the mounting structure and hence the tree on which it is secured.

The platform member includes a diagonal brace that consists of upper and lower U-shaped sections, generally designated respectively by the numerals 62 and 63, and that has engagement components at its opposite ends. The upper engagement component consists of an internal lip element 64 and an external flange 66, which cooperatively defines a downwardly opening arcuate channel 65; parallel arm elements 68 extend from the opposite ends of the engagement component. The lower engagement component is generally designated by the numeral 70, and consists of an upper panel 71 and a lower panel 76, joined along their lengths by an internal wall 75. An arcuate inner marginal edge 72 is formed on the upper panel 71, which rides upon the lower track member 60, the latter being received in the rearward channel 73 that is formed between the panels 71, 76. A pair of parallel arm portions 74 also extend from the opposite ends of the upper panel 71, and are joined to the arm portions 68 of the upper section 62 to form the diagonal brace; the end portions 88, 89 of the arm portions 68, 74, respectively, are flattened to facilitate their attachment to one another, suitable apertures 90 and fasteners 91 being provided for that purpose. The spaced panels 71, 76 also define a forward channel 78, into which extend the ends of thumb screws 80, threadably engaged in the upper panel 71.

The platform assembly (shown in phantom line) consists of a rectangular frame 82, to which are attached U-shaped brackets 86 and 98. A tongue portion 84 of a lower platform 92 is supported by the frame 82, and extends therethrough into engagement within the forward channel 78 of the lower engagement component 70, being secured therein by the thumb screws 80. The free ends of the opposite arm portions of the bracket 86 are engaged in aligned apertures 90 in the end portions 88, 89, to unite the frame 82 with the diagonal bracket. A pair of chains or cables 94 are attached at one end to the frame 82, and provide added support for the platform 92. The upper platform 96 is provided by a length of fabric, the opposite ends of which are looped about the crosspieces of the frame 82 and the supplemental frame 98, and fastened in place by means such as rivets or stitching.

As will be appreciated, the engagement components of the platform member depicted in FIG. 3 permit it to be angularly reoriented to any position about the mounting structure. Consequently, a platform assembly supported thereby can also be readily reoriented, as desired and as hereinabove described.

Although the best presently known modes for practicing the invention have been set forth herein, it will be appreciated that variations may be made in features of the instant tree stand without departing from the novel concepts hereof. Materials of construction will be evident to those skilled in the art, but normally lightweight metals or plastics will be found most advantageous for use in fabricating the main components of the mounting structure and platform member. Bearing surfaces will advantageously be provided by elements or coatings of plastics having low frictional coefficients, and wheels or rollers made of nylon or the like will often be found to best afford durable and smooth-acting bearing elements.

Thus, it can be seen that the present invention provides a tree stand that is readily secured in position on the trunk of the supporting tree, and that permits facile reorientation of the platform member to positions displaced angularly thereabout. The platform member of the stand may itself provide the required platform or platforms, or it may instead function as an adaptor, providing means by which a separate platform assembly may be attached thereto for support by a tree.

Having thus described the invention, what is claimed is:

1. A tree stand having a rotatable platform member, comprising:

mounting structure, including at least a first circular track member, having an outside surface portion thereon for circumscribing a supporting tree trunk at a first level, and fastening means for disengageably fastening said mounting structure to a tree trunk with said first track member extending thereabout; and a platform member having first and second engagement components operatively joined to one another at axially and transversely spaced positions, for receiving a tree trunk axially therebetween and for operative engagement on transversely opposite sides thereof at different levels, said first engagement component slidably engaging said outside surface portion of said first track member, and said second engagement component being disposed to slidably engage a surface below said first track member, to permit rotation of said platform member to positions angularly displaced about said mounting structure.

2. The stand of claim 1 wherein said mounting structure includes a second circular track member having an outside surface portion thereon, wherein said track members are rigidly connected to one another, and wherein said engagement component engages said outside surface portion of said second track member.

3. The stand of claim 1 wherein at least one of: (a) said engagement components, and (b) said track member, comprises low-friction elements.

4. The stand of claim 3 wherein said low friction elements are rollers and comprise said engagement components.

5. The stand of claim 1 wherein said platform member includes at least one platform that is substantially horizontally disposed in said portion of normal use.

6. The stand of claim 5 wherein said one platform has one of said first and second engagement components thereon.

7. The stand of claim 10 where said first and second components are joined to one another by a brace having elements that extend generally diagonally therebetween.

8. The stand of claim 7 wherein said platform member comprises a bracket having attachment means for attaching a separate platform assembly to said stand, wherein said second engagement component includes said attachment means, and wherein said brace has means thereon for engaging elements of such a platform assembly for the cooperative support thereof.

9. The stand of claim 1 wherein said platform member comprises a bracket having attachment means for attaching a separate platform assembly to said stand.

10. The stand of claim 9 wherein said second engagement component includes said attachment means.

* * * * *